United States Patent
Tiwari

(10) Patent No.: US 10,912,142 B2
(45) Date of Patent: Feb. 2, 2021

(54) DEVICE AND METHOD OF HANDLING RADIO RESOURCE CONTROL CONNECTION RESUME PROCEDURE

(71) Applicant: HTC Corporation, Taoyuan (TW)

(72) Inventor: Kundan Tiwari, Taoyuan (TW)

(73) Assignee: HTC Corporation, Taoyuan (TW)

(*) Notice: Subject to any disclaimer, the term of this patent is extended or adjusted under 35 U.S.C. 154(b) by 0 days.

(21) Appl. No.: 15/472,286

(22) Filed: Mar. 29, 2017

(65) Prior Publication Data
US 2017/0290083 A1   Oct. 5, 2017

Related U.S. Application Data
(60) Provisional application No. 62/316,586, filed on Apr. 1, 2016.

(51) Int. Cl.
*H04W 76/25* (2018.01)
*H04W 76/19* (2018.01)

(52) U.S. Cl.
CPC .......... *H04W 76/25* (2018.02); *H04W 76/19* (2018.02)

(58) Field of Classification Search
CPC ..... H04W 76/27; H04W 76/25; H04W 76/19; H04W 12/0017
See application file for complete search history.

(56) References Cited

U.S. PATENT DOCUMENTS

| 2010/0111039 | A1  | 5/2010 | Kim |
| 2010/0172301 | A1  | 7/2010 | Watfa |
| 2013/0039287 | A1* | 2/2013 | Rayavarapu .......... H04W 76/28 370/329 |
| 2016/0219495 | A1* | 7/2016 | Martin ................. H04W 48/16 |

(Continued)

FOREIGN PATENT DOCUMENTS

| CN | 102695152 A | 9/2012 |
| CN | 102710798 A | 10/2012 |

(Continued)

OTHER PUBLICATIONS

3GPP TS 24.301 V13.5.0 (Mar. 2016); Technical Specification; 3rd Generation Partnership Project; Technical Specification Group Core Network and Terminals; Non-Access-Stratum (NAS) protocol for Evolved Packet System (EPS); Stage 3 (Release 13).

(Continued)

*Primary Examiner* — Ricardo H Castaneyra
(74) *Attorney, Agent, or Firm* — Winston Hsu

(57) ABSTRACT

A communication device for handling a radio resource control (RRC) connection resume procedure comprises a storage unit for storing instructions and a processing circuit coupled to the storage unit. The processing circuit is configured to execute the instructions stored in the storage unit. The instructions comprise resuming a RRC connection suspended by a RRC message, when initiating a service request procedure; transmitting a first EXTENDED SERVICE REQUEST message comprising a service type information element (IE) to the network after the RRC connection is resumed, if the service request procedure is initiated for a packet switched (PS) service and the communication device is required to transmit an information element related to the PS service other than the service type IE.

5 Claims, 3 Drawing Sheets

(56) References Cited

U.S. PATENT DOCUMENTS

2016/0278160 A1* 9/2016 Schliwa-Bertling .................. H04W 48/02

FOREIGN PATENT DOCUMENTS

CN 103260219 A 8/2013
EP 2 503 838 A3 10/2012

OTHER PUBLICATIONS

3GPP TS 23.401 V13.6.0 (Mar. 2016); Technical Specification; 3rd Generation Partnership Project; Technical Specification Group Services and System Aspects; General Packet Radio Service (GPRS) enhancements for Evolved Universal Terrestrial Radio Access Network (E-UTRAN) access; (Release 13).
3GPP TS 36.331 V13.0.0 (Dec. 2015); Technical Specification; 3rd Generation Partnership Project; Technical Specification Group Radio Access Network; Evolved Universal Terrestrial Radio Access (E-UTRA); Radio Resource Control (RRC); Protocol specification (Release 13).
Search Report dated Aug. 25, 2017 for EP application No. 17163736.6, pp. 1-8.
3GPP TR 23.720 V13.0.0 (Mar. 2016), "3rd Generation Partnership Project; Technical Specification Group Services and System Aspects; Study on architecture enhancements for Cellular Internet of Things (Release 13)", XP051086108, pp. 1-94.
3GPP TS 24.301 V13.5.0 (Mar. 2016), "3rd Generation Partnership Project; Technical Specification Group Core Network and Terminals; Non-Access-Stratum (NAS) protocol for Evolved Packet System (EPS); Stage 3 (Release 13)", XP051088177, pp. 1-414.

* cited by examiner

DEVICE AND METHOD OF HANDLING RADIO RESOURCE CONTROL CONNECTION RESUME PROCEDURE

CROSS REFERENCE TO RELATED APPLICATIONS

This application claims the benefit of U.S. Provisional Application No. 62/316,586 filed on Apr. 1, 2016, which is incorporated herein by reference.

BACKGROUND OF THE INVENTION

1. Field of the Invention

The present invention relates to a device and a method used in a wireless communication system, and more particularly, to a device and a method of handling a radio resource control connection resume procedure.

2. Description of the Prior Art

A long-term evolution (LTE) system provides high data rate, low latency, packet optimization, and improved system capacity and improved coverage. The LTE system is evolved continuously to increase peak data rate and throughput by using advanced techniques, such as carrier aggregation (CA), dual connectivity, licensed-assisted access, etc. In the LTE system, a radio access network known as an evolved universal terrestrial radio access network (E-UTRAN) includes at least one evolved Node-B (eNB) for communicating with at least one user equipment (UE), and for communicating with a core network. The core network may include a mobility management and a Quality of Service (QoS) control of the at least one UE.

According to the current 3GPP specification defined for the LTE system, a UE in a connected mode may receive a radio resource control (RRC) message for suspending a Dedicated Radio Bearer (DRB) of the UE from an eNB. The DRB and a non-access stratum (NAS) signaling connection is suspended accordingly. The UE may transmit another RRC message to resume the suspended DRB and the suspended NAS signaling connection, if the UE decides to transmit user data or signaling. However, according to the current 3GPP specification, the UE is not allowed to initiate a service request procedure to resume the suspended NAS signaling connection and the suspended DRB as the DRB is already established. Therefore, a SERVICE REQUEST message and an EXTENDED SERVICE REQUEST message, which are messages related to the establishment of the DRB and the NAS signaling connection, should not be transmitted after the DRB is resumed. However, according to the current 3GPP specification, the UE is allowed to transmit the EXTENDED SERVICE REQUEST message after the RRC connection is resumed and the EXTENDED SERVICE REQUEST message is allowed for both the circuit switched (CS) service and the packet switched (PS) service. Communication operations of the UE are thus not clear and it is not proper to stop transmitting the EXTENDED SERVICE REQUEST message under such circumstances. Therefore, it is important to identify when the EXTENDED SERVICE REQUEST message shall be and shall not be transmitted.

SUMMARY OF THE INVENTION

The present invention therefore provides a communication device for handling a radio resource control connection resume procedure to solve the abovementioned problem.

A communication device for handling a radio resource control (RRC) connection resume procedure comprises a storage unit for storing instructions and a processing circuit, coupled to the storage unit. The processing circuit is configured to execute the instructions stored in the storage unit. The instructions comprise establishing a RRC connection with a network; suspending the RRC connection, when receiving a RRC message for suspending the RRC connection; resuming the RRC connection with the network, when initiating a service request procedure; transmitting a first EXTENDED SERVICE REQUEST message comprising a service type information element (IE) to the network after the RRC connection is resumed, if the service request procedure is initiated for a packet switched (PS) service and the communication device is required to transmit an information element related to the PS service other than the service type IE.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
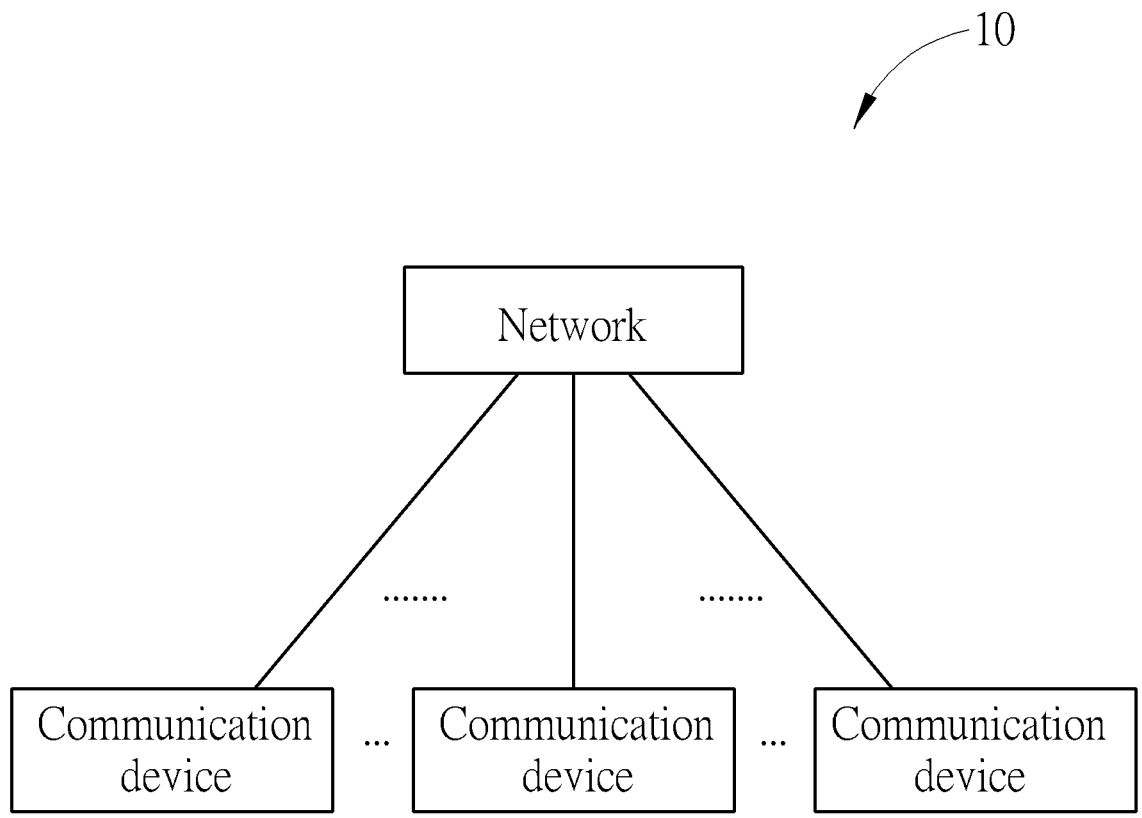
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via multiple cells (e.g., multiple carriers) including a primary cell (PCell) and one or more secondary cells (SCells). The abovementioned cells may be operated in the same or different frame structure types, or in the same or different duplexing modes, i.e. frequency-division duplexing (FDD) and time-division duplexing (TDD). For example, the PCell may be operated on a licensed carrier, while the SCell may be operated on an unlicensed carrier.

In FIG. 1, the network and the communication devices are simply utilized for illustrating the structure of the wireless communication system 10. Practically, the network may be a global system for mobile communications (GSM) enhanced data rates for GSM evolution (EDGE) Radio Access Network (GERAN), a narrowband (NB) internet of things (IoT) network or an evolved universal terrestrial radio access network (E-UTRAN) including at least one evolved Node-B (eNB). The network may be a fifth generation (5G) network including at least one 5G base station (BS) which employs orthogonal frequency-division multiplexing (OFDM) and/or non-OFDM (e.g., filtered OFDM (F-OFDM), Generalized Frequency Division Multiplexing (GFDM), Universal Filtered Multi-Carrier (UFMC) or Filter Back Multi-Carrier (FBMC)), and a transmission time interval (TTI) shorter than 1ms (e.g. 100 or 200 microseconds). In general, a BS may also be used to refer any of the eNB and the 5G BS.

Furthermore, the network may also include the GERAN/UTRAN/E-UTRAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network.

A communication device may be a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
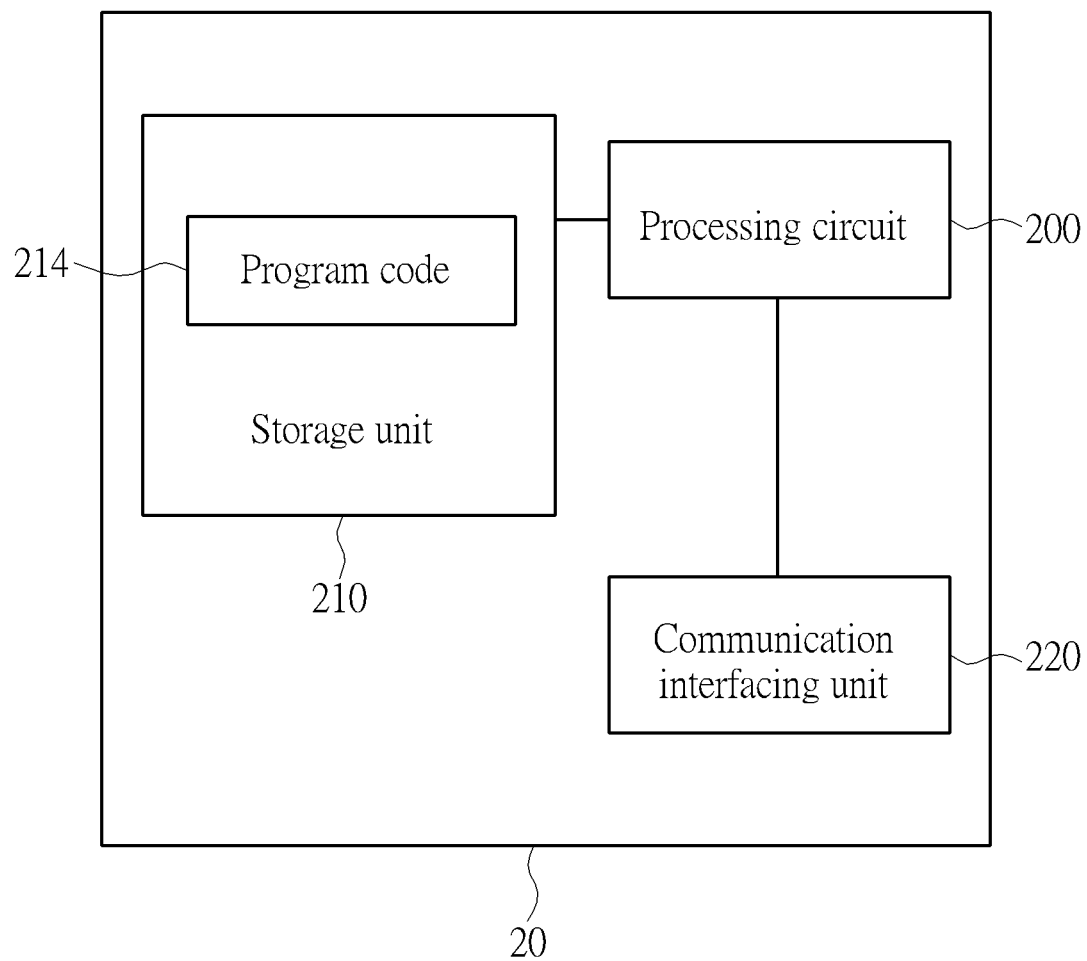
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage unit 210 and a communication interfacing unit 220. The storage unit 210 may be any data storage device that may store a program code 214, accessed and executed by the processing circuit 200. Examples of the storage unit 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing circuit 200.

In the following embodiments, a UE is used to represent a communication device in FIG. 1, to simplify the illustration of the embodiments.

Figure 3:
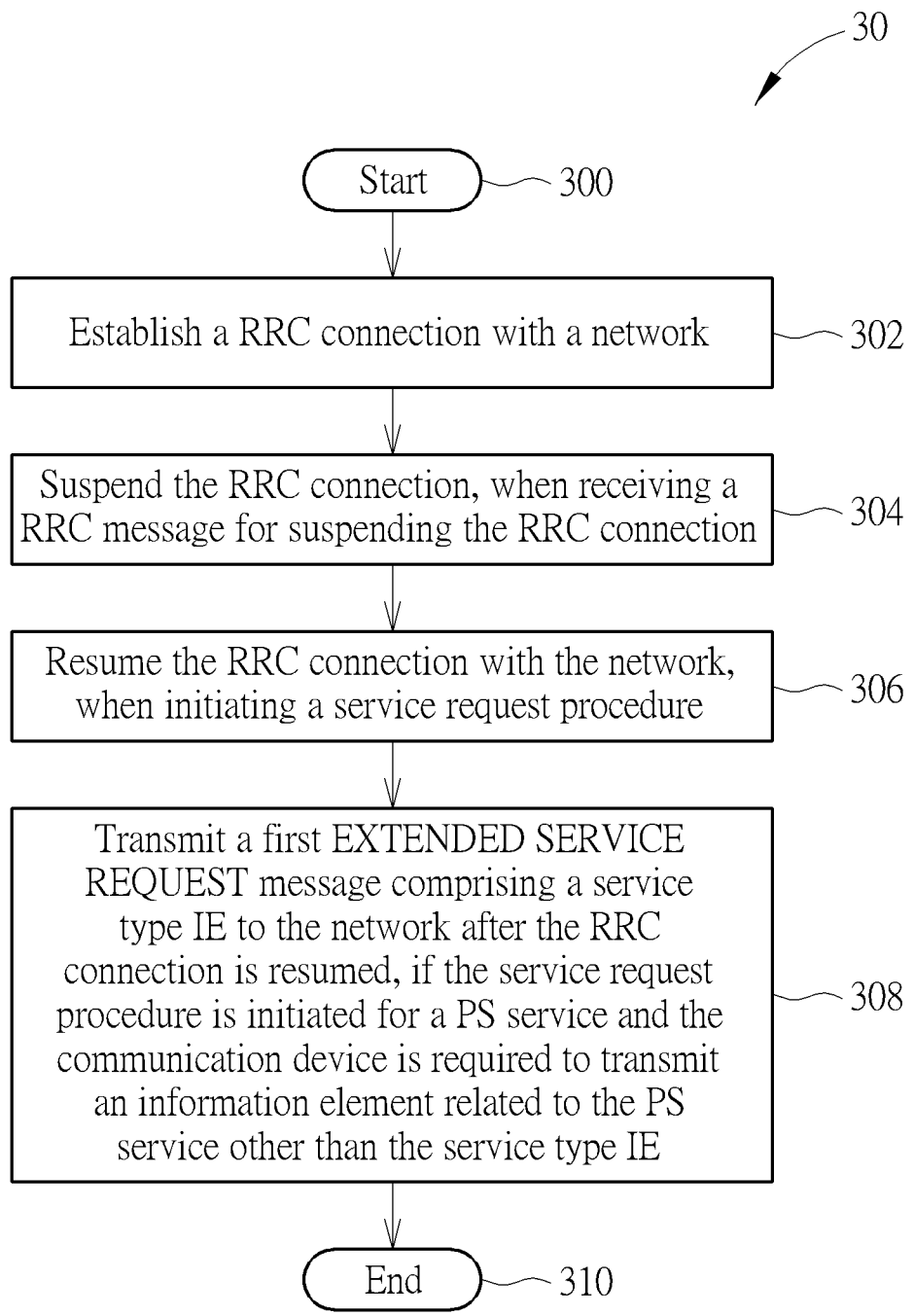
FIG. 3 is a flowchart of a process according to an example of the present invention.

FIG. 3 is a flowchart of a process 30 according to an example of the present invention. The process 30 can be utilized in the UE shown in FIG. 1, for handling a radio resource control (RRC) connection resume procedure. The process 30 may be compiled into the program code 214 and includes the following steps:
Step 300: Start.
Step 302: Establish a RRC connection with a network.
Step 304: Suspend the RRC connection, when receiving a RRC message for suspending the RRC connection.
Step 306: Resume the RRC connection with the network, when initiating a service request procedure.

Step 308: Transmit a first EXTENDED SERVICE REQUEST message comprising a service type information element (IE) to the network after the RRC connection is resumed, if the service request procedure is initiated for a packet switched (PS) service and the communication device is required to transmit an information element related to the PS service other than the service type IE.
Step 310: End.

According to the process 30, the UE establishes a RRC connection with a network. Then, the UE suspends the RRC connection, when receiving a RRC message for suspending the RRC connection. When initiating a service request procedure, the UE resumes the RRC connection with the network. If the service request procedure is initiated for a PS service, the UE does not transmit a first EXTENDED SERVICE REQUEST message to the network after the RRC connection is resumed, wherein the first EXTENDED SERVICE REQUEST message includes a service type IE. The UE transmits the first EXTENDED SERVICE REQUEST message for the PS service to the network under certain circumstances, for example, when the UE is required to transmit an information element related to the PS service other than a service type IE. In other words, the UE determines not to transmit the first EXTENDED SERVICE REQUEST message to the network if the service request procedure is initiated for the PS service except when the UE is configured to transmit the information element related to the PS service that is different from the service type IE.

Realization of the process 30 is not limited to the above description. The following examples may be applied to the process 30.

In one example, the EXTENDED SERVICE REQUEST message is transmitted in the RRC connection setup complete message or RRC connection resume complete message for the UE configured for NAS signaling with low priority to establish DRB related to PS domain.

In one example, the RRC message may include a first identifier. In one example, the first identifier is ResumeIdentity as defined in the RRC connection Release message and the first RRC message is RRC Connection release message.

In one example, the first EXTENDED SERVICE REQUEST message may include a service type set to packet services via S1.

In one example, the UE may further transmit a second EXTENDED SERVICE REQUEST message to the network after the RRC connection is resumed, if the service request procedure is initiated for a circuit switched (CS) service. In one example, the second EXTENDED SERVICE REQUEST message may include a service type set to "mobile originating CS fallback or 1xCS fallback", "mobile terminating CS fallback or 1xCS fallback", or "mobile originating CS fallback emergency call or 1xCS fallback emergency call".

In one example, the UE may not transmit a SERVICE REQUEST message to the network after the RRC connection is resumed, if the service request procedure is initiated for the PS service.

In one example, the UE may realize Step 302 as follows. The UE transmits a first RRC Connection Request message to the network, and receives a first RRC Connection Setup message from the network. Then, the UE transmits the RRC Connection Setup Complete message to the network.

In one example, the UE may stores at least one of a RRC configuration, a dedicated radio bearer (DRB) configuration, an access stratum security context, a plurality of layer 1 parameters and a plurality of layer 2 parameters when the RRC connection is suspended.

In one example, the RRC message may be a RRC Connection Release message comprising a release cause indicating a suspension of the RRC connection.

In one example, the UE may suspend a NAS signaling connection of the UE. Then, the UE may transfer to an Evolved Packet Service (EPS) Mobility Management (EMM) IDLE mode with a suspend indication, and the UE may not release the NAS signaling connection.

In one example, the UE may realize Step 306 as follows. The UE transmits a RRC Connection Resume Request message, a second RRC Connection Request message or a RRC Connection Reestablishment Request message with a second identifier to the network. Accordingly, the UE receives a RRC Connection Resume message, a second RRC Connection Setup message or a RRC Connection Reestablishment Complete message from the network. In response of receiving the RRC Connection Resume message, the UE may transmit the RRC Connection Resume Complete message.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the UE 20.

To sum up, the present invention provides a device and a method for handling a RRC connection. Not only the RRC connection can be resumed, but extra messages related to a service request procedure can be reduced. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a radio resource control (RRC) connection resume procedure, comprising:
    a storage device; and
    a processing circuit, coupled to the storage device, wherein the storage device stores, and the processing circuit is configured to execute instructions of:
    establishing a RRC connection with a network;
    suspending the RRC connection, when receiving a RRC message for suspending the RRC connection, wherein the RRC message comprises a RRC Connection Release message comprising a release cause indicating suspending the RRC connection;
    suspending a Non-Access Stratum (NAS) signaling connection;
    transferring to an Evolved Packet Service (EPS) Mobility Management (EMM) IDLE mode;
    not releasing the NAS signaling connection;
    resuming the RRC connection with the network, when initiating a service request procedure;
    transmitting a suspending EXTENDED SERVICE REQUEST message to the network after the RRC connection is resumed, if the service request procedure is initiated for a packet switched (PS) service, and if the suspending EXTENDED SERVICE REQUEST message comprises a service type information element (IE) set to packet services via S1 and an EPS bearer context status IE;
    not transmitting the suspending EXTENDED SERVICE REQUEST message to the network after the RRC connection is resumed, if the service request procedure is initiated for the PS service, and if the suspending EXTENDED SERVICE REQUEST message comprises the service type IE set to packet services via S1 but does not comprise the EPS bearer context status IE; and
    not transmitting a suspending SERVICE REQUEST message to the network after the RRC connection is resumed, if the service request procedure is initiated for the PS service.

2. The communication device of claim 1, wherein the RRC message comprises a first identifier.

3. The communication device of claim 1, wherein the instruction of establishing the RRC connection with the network comprises:
    transmitting a first RRC Connection Request message to the network;
    receiving a first RRC Connection Setup message from the network; and
    transmitting a RRC Connection Setup Complete message to the network.

4. The communication device of claim 1, wherein the instruction of suspending the RRC connection comprises:
    storing at least one of a RRC configuration, a dedicated radio bearer (DRB) configuration, an access stratum security context, a plurality of layer 1 parameters and a plurality of layer 2 parameters.

5. The communication device of claim 1, wherein the instruction of resuming the RRC connection when initiating the service request procedure comprises:
    transmitting a RRC Connection Resume Request message, a second RRC Connection Request message or a RRC Connection Reestablishment Request message with a second identifier to the network; and
    receiving a RRC Connection Resume Complete message, a second RRC Connection Setup message or a RRC Connection Reestablishment Complete message from the network.

* * * * *